Figure 1:
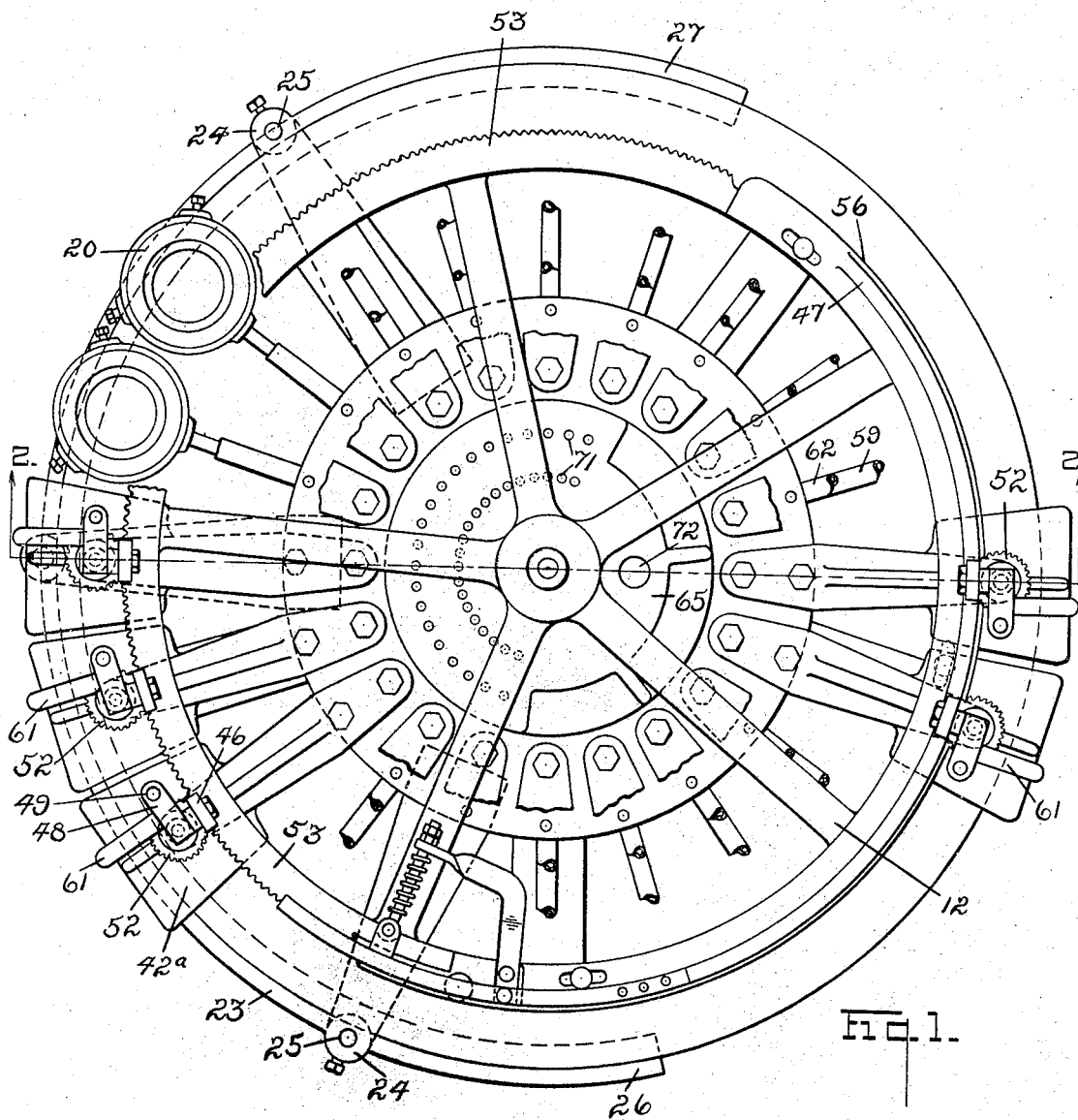

March 23, 1926.  1,577,536

A. C. PARKER ET AL

APPARATUS FOR SEVERING GLASS

Filed April 3, 1924  4 Sheets-Sheet 1

Inventor
Alvah C. Parker.
Carl W. Schreiber.

By Owen, Owen & Crampton

Attorneys

March 23, 1926.

A. C. PARKER ET AL 1,577,536

APPARATUS FOR SEVERING GLASS

Filed April 3, 1924    4 Sheets-Sheet 3

Inventor
Alvah C. Parker.
Carl W. Schreiber.

By Owen, Owen & Crampton
Attorneys

March 23, 1926.

A. C. PARKER ET AL 1,577,536

APPARATUS FOR SEVERING GLASS

Filed April 3, 1924    4 Sheets-Sheet 4

Inventor
Alvah C. Parker.
Carl W. Schreiber.

By Owen, Owen & Crampton

Attorneys

Patented Mar. 23, 1926.

1,577,536

UNITED STATES PATENT OFFICE.

ALVAH C. PARKER AND CARL W. SCHREIBER, OF TOLEDO, OHIO, ASSIGNORS TO THE LIBBEY GLASS MANUFACTURING COMPANY, OF TOLEDO, OHIO, A CORPORATION OF OHIO.

APPARATUS FOR SEVERING GLASS.

Application filed April 3, 1924. Serial No. 703,855.

*To all whom it may concern:*

Be it known that we, ALVAH C. PARKER and CARL W. SCHREIBER, citizens of the United States, and residents of Toledo, in the county of Lucas and State of Ohio, have made an Invention Appertaining to Apparatus for Severing Glass; and we hereby declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to apparatus for severing glass and more especially it relates to the trimming of the necks and the annealing of hollow glass articles.

We have illustrated and will describe our invention as applied to the manufacture of incandescent lamp bulbs which, as blown, have necks that need to be cut off or trimmed, but its utility is not confined to bulbs. When a bulb is made by an automatic machine, its neck terminates in a comparatively heavy ring of glass which supported the blank during the manipulation thereof by the machine. It is old to position such a bulb with its neck down, melt a narrow ring around the neck and allow the weight of the heavy end to draw the neck down until it is severed.

As heretofore practiced, the bulb has been rotated adjacent one or more flames which played on its neck, and when heated in this manner the neck melts for a sufficient disstance on each side of the line at which severance is desired, so that the neck narrows in as it is drawn down and after severance, and the end of the neck has to be finished in some manner to remove this inwardly slanting flange of glass.

We use a very thin and hot annular flame so that an extremely narrow band of glass around the neck may be speedily heated to the melting point, whereby the neck may be trimmed off smoothly and not require further finishing. A burner suitable for this purpose is disclosed in detail in the patent on gas burner issued to Ernest C. Schrader, December 4, 1923, Serial No. 1,476,184. We also apply a flame to the top of the bulb while the neck is being trimmed off, so that the bulb will be annealed during the trimming process.

We have devised an apparatus especially adapted to treat glassware in the above described manner and the more important features of the apparatus will appear as the description proceeds and will be pointed out in the appended claims.

Figure 2:
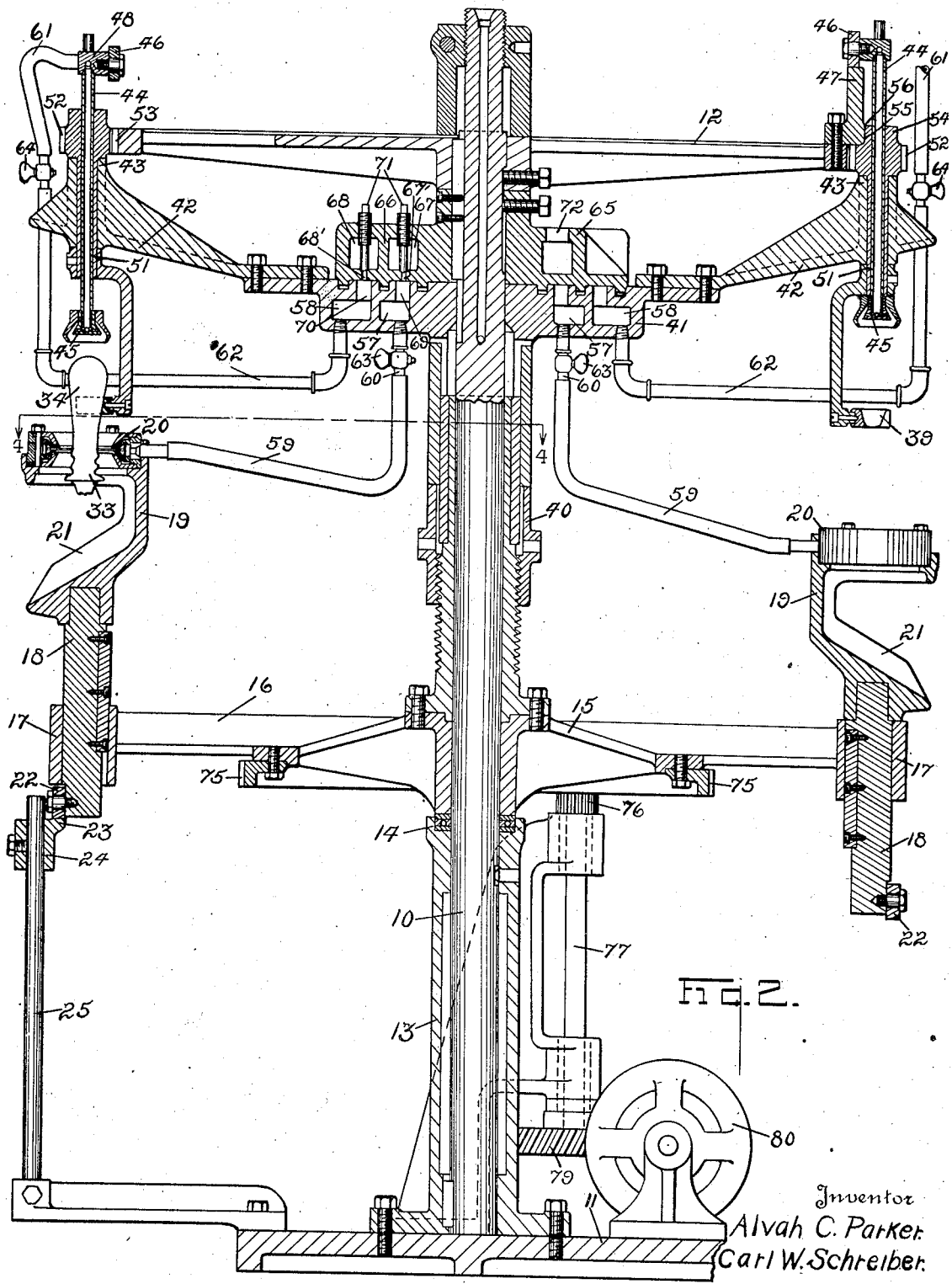
Figure 3:
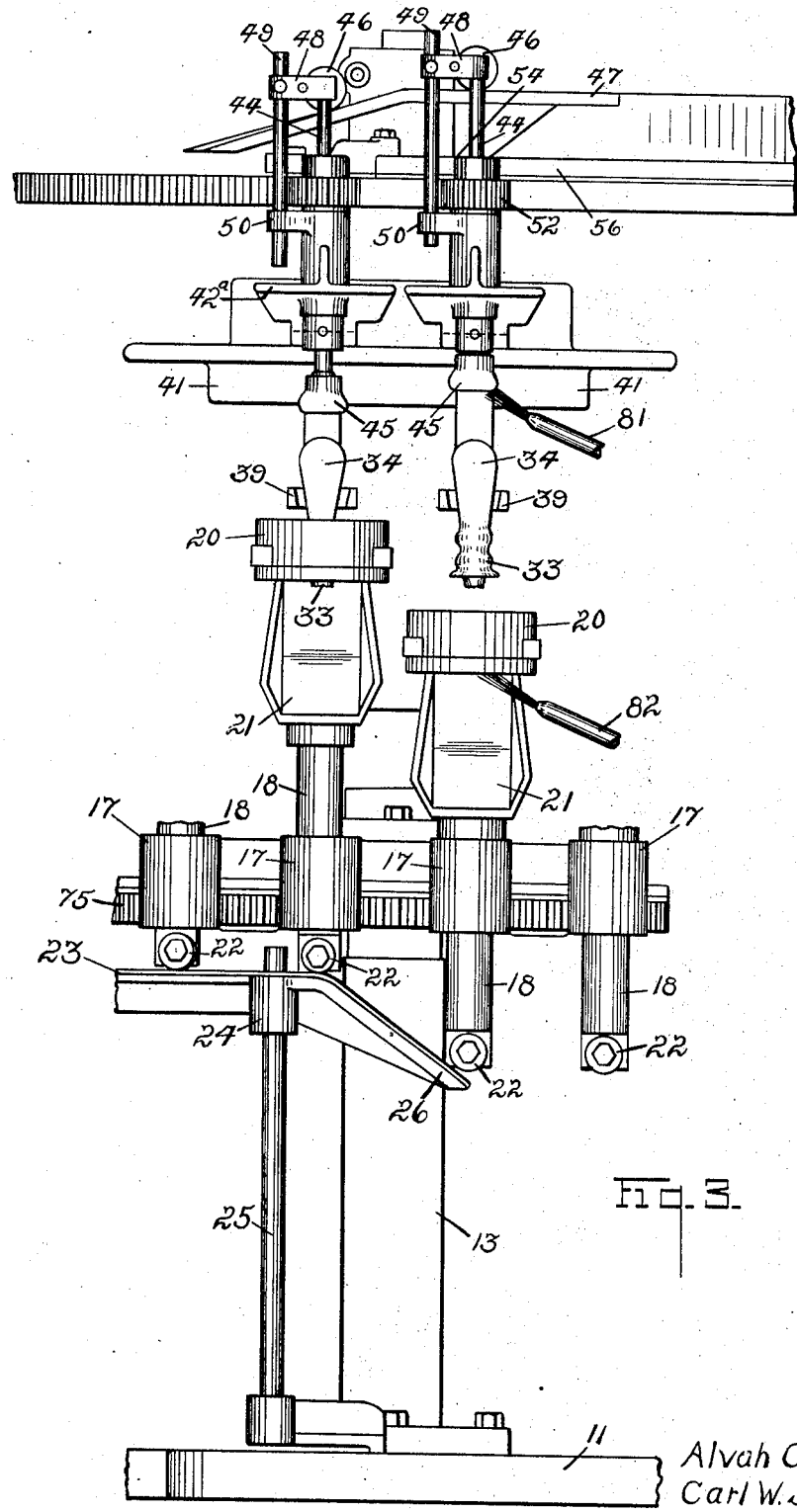
Figure 4:
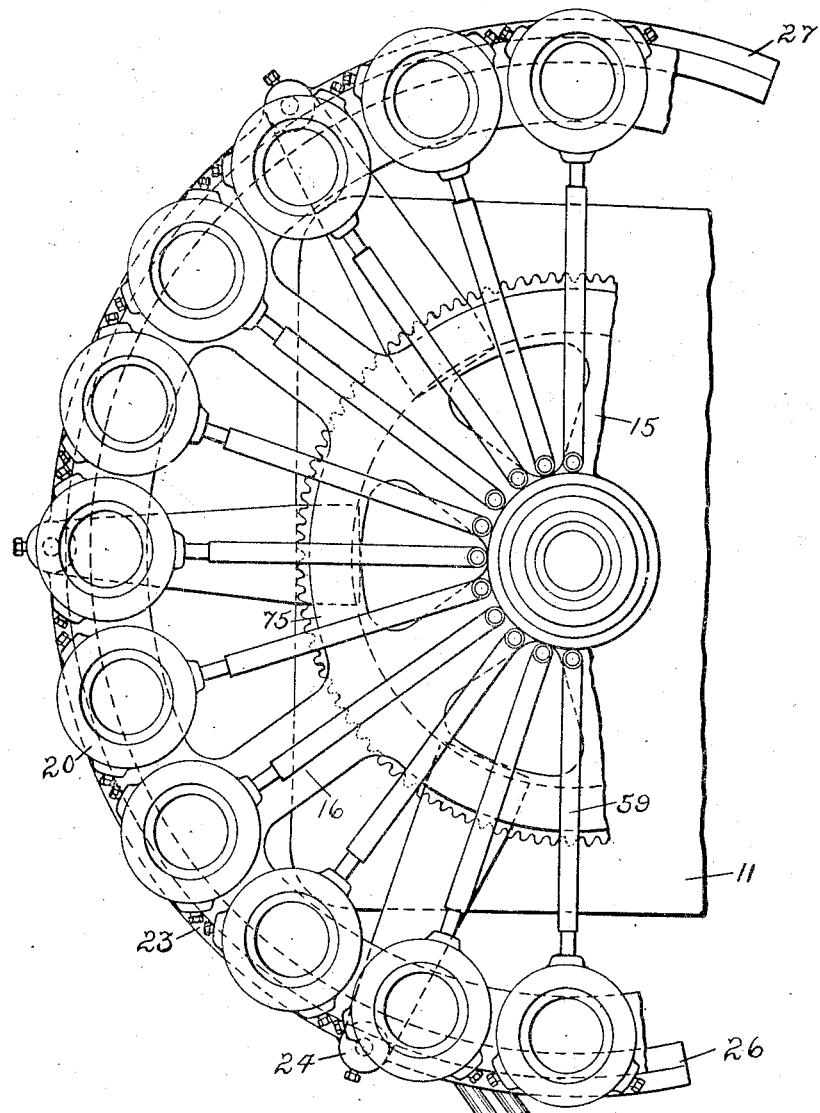

Referring to the accompanying drawings, Figure 1 is a plan view of the apparatus; Fig. 2 is a vertical section on line 2—2 of Fig. 1; Fig. 3 is a side elevation of a portion of the apparatus; and Fig. 4 is a partial horizontal section on the line 4—4 of Fig. 2.

A central vertical column 10 is supported on a base 11 and carries attached to its upper end a spider 12. Surrounding the lower end of the column is a pedestal 13, carrying on its upper end a bearing 14. A hub 15 is mounted about the column upon the bearing 14 and carries a spider 16. In the periphery of this spider 16 is a series of bearings 17 in each of which there is a vertically reciprocable shaft 18. Each shaft 18 carries on its upper end a casting 19. Each casting 19 has a seat at its upper end for an annular burner 20, and beneath the burner is an outwardly slanting chute 21. The lower end of each shaft 18 carries a roller 22, which is adapted to run on a cam track 23, supported by collars 24 upon supporting rods 25. The main part of the cam track 23 is substantially horizontal, but it has downwardly turned ends 26 and 27 so that the shaft, casting and burner are held elevated while the roller is traversing the main part of the cam track, but are lowered the remainder of the time. When elevated, the burner is in position to melt off the moil 33 from a bulb 34 held in a fork 39 to be described later.

Above the hub 15 there is a longitudinally-adjustable sleeve 40, supporting at its upper end a chambered disk 41. A series of castings 42 project from the disk, each casting having a bearing 43 within which there is mounted a vertically-reciprocable hollow shaft 44 in line with a burner 20. Each of these shafts carries a burner 45 at its lower end, and is carried at its upper end by a roller 46, adapted to run upon a cam track 47. Each shaft 44 has affixed to its upper end a bracket 48, carrying a rod 49, which is vertically-reciprocable within a socket 50 in the casting 42. (See Fig. 3.) The rod 49 is adjustable in the bracket 48, and when the roller 46 runs off from the cam track 47 the rod 44 and its burner will be lowered until the rod 49 strikes the extension 42ª of the casting 42. By adjusting the rod 49 in the bracket 48, the point to which the hollow shaft and its burner is lowered may be accurately controlled.

Surrounding the hollow shaft 44 is a sleeve 51, carrying on its lower end a fork 39 adapted to receive a bulb. On the upper end of the sleeve 51 is a gear 52, adapted to mesh with a rack 53. The rack 53 is substantially 190° in length, as shown on Fig. 1, and the gear 52 carries on its upper surface a protuberance 54, having a flattened side 55, and this flattened side 55 engages a member 56 during the portion of the travel of the gear when it is not engaged by the teeth on the rack 53, so that during the time that the sleeve with its bulb carrying fork is not being revolved it will be held in the position in which it is shown in Fig. 2 and a bulb may be readily taken out or placed in the fork while it is not rotating.

The disk 41 has a series of chambers 57 and 58, and a flexible pipe 59 leads to each annular burner from a nipple 60 connecting with a chamber 57. In like manner a flexible pipe 61 is attached to the top of each hollow shaft 44 and connects by means of pipe 62 with a chamber 58. There is a separate chamber for each burner. Valves 63 and 64 may be placed at convenient points in the connections between the burners and the chambers.

A plate 65 overlies the disk 41. The plate 65 is provided with a cavity which is divided by a partition 66 into two chambers 67 and 68. The chamber 67 is provided with a series of downwardly directed orifices 67' beneath which an inlet opening 69 for each chamber 57 passes in succession. Similarly, the chamber 68 is provided with a series of downwardly directed orifices 68' beneath which an inlet opening 70 for each chamber 58 passes in succession. A needle valve 71 is provided for each orifice in each series, so that each orifice may be accurately and independently opened the desired amount or closed. There is a separate chamber 57 for each burner 20, and a separate chamber 58 for each burner 45. A suitable mixture of gas and air may be introduced into the chamber 67, as through orifice 72, and gas may be introduced into chamber 68 from chamber 67 or from an independent source, as desired.

To the lower side of spider 16 there is attached an annular rack 75, adapted to be driven by a gear 76 on one end of a shaft 77, which has on its other end a worm gear 79, driven from any suitable source of power, as motor 80.

In use, the apparatus is driven continuously, and the bulbs are placed in the forks while the forks are passing around the side of the machine where the surface 55 is in engagement with the member 56, so that the forks are held in proper position to receive the bulbs. When a fork reaches the position shown at the right in Fig. 3, the bulb will have been placed therein. As the unit passes to the position shown at the left, the shaft carrying the burner is elevated, so that the annular burner will be properly positioned around the line at which the neck of the bulb is to be trimmed, and the burner 45 is lowered to suitable relation with the top of the bulb. As will be noted by a comparison with Fig. 1, the fuel is supplied to the burners at about this point. Stationary burners 81 and 82 (Fig. 3) may be positioned adjacent the points that the burners 20 and 45 will occupy when the fuel is turned on, so as to light the latter.

As the unit continues in its movement, the gear 52 will mesh with the rack 53 and the fork 39 rotates the bulb so that the neck is melted uniformly in spite of any slight irregularities in the flame. The glass being thin and being continuously exposed to the hot point of a thin flame, it is melted very quickly along a narrow line, so that the weight of the moil draws down the waste end of the neck and it is cleanly severed along the desired line without any objectionable deformation of the remaining end of the neck. When the moil is melted off it drops down and is guided outward by the chute to a suitable cullet receptacle, not shown. The top of a bulb is heated by burner 45 to some extent at the same time that the heat rising from burner 20 heats the sides, so that by this means the bulb is annealed sufficiently for all practical purposes, and the loss of bulbs is found to be extremely low when this apparatus is used. The needle valves 71 are adjusted so as to give the desired amount of fuel to the burners 20 and 45 at each point in their travel and to shut off the supply entirely at the desired point. In practice, the burning off operation is completed in about 30° travel, whereas the annealing operation may require the entire 190°. If individual burners should vary slightly in their characteristics, the amount of fuel which they receive may be regulated by turning their individual valves 63, 64.

When desired the valves may be adjusted so that the flames will continue, though with reduced intensity, for some time after the severance is completed.

Suitable changes in a supporting and heating means allows the treatment of articles other than bulbs where desired. Other means than the weight of the moil may be used to produce the necessary stretching strain along the line of severance.

Other changes within the scope of the appended claims may be made without departing from the spirit of the invention.

What we claim is:

1. Apparatus for severing glass articles having forms of rotation, comprising means to support such an article, means to move the support in a closed path, an annular burner, and means to move the burner into position about the proposed line of severance of an article in the support and move the burner with the support until the glass is melted along said line.

2. In apparatus for melting the moil off of glassware, a support for a glass article, means for moving the support in an endless path, means to rotate the support about the axis of the supported article while it traverses a portion of the path, means to melt off the moil while the article is rotating, and means to hold the support against rotation while it traverses another portion of the path.

3. In apparatus for finishing glass bulbs, a bulb support comprising horizontal, spaced prongs, means for moving the support in a circular path, means for rotating the support about the axis of a supported bulb while it traverses a portion of the path, means for removing the surplus glass from the neck of a bulb while it is being rotated, and means to hold the support against rotation with the prongs pointing outward during a portion of the path.

4. Apparatus for finishing glass articles, comprising an article support, a cooperating burner, means to move the support and burner simultaneously and continuously in a closed path, means to move the burner into and out of position adjacent the neck of an article in the support, and automatic means to supply regulated amounts of fuel to the burner while it is adjacent the article.

5. Apparatus for finishing glass articles, comprising an article support, a cooperating burner, means to move the support and burner simultaneously and continuously in a closed path, means to move the burner into and out of position adjacent the neck of an article in the support, automatic means to supply regulated amounts of fuel to the burner while it is adjacent the article, means to rotate the support while fuel is so supplied, and means to prevent the rotation of the support throughout a portion of the path.

6. Apparatus for finishing glass articles, comprising a support for supporting an article neck down, means to move the support in an endless path, an annular burner beneath the support, means to move the burner with the support in the endless path, and means to move the burner upward around the neck of a bulb in the support and retain it there to melt off surplus glass and to thereafter lower it from about said neck.

7. Apparatus for finishing glass articles, comprising a support for supporting an article neck down, an annular burner, means to move the burner to position about the neck of an article in the support, a second burner, means to move said second burner to position adjacent the other end of the article while the annular burner is about its neck, and means for moving the support to rotate the article upon its axis while the burners are adjacent thereto.

8. Apparatus for finishing glass bulbs, comprising a bulb support, means for moving the support in an endless path, means for melting off surplus glass from the neck of the bulb while it is moving in said path, and means for heating the top of the bulb while the neck is being melted off.

9. Apparatus for finishing glass articles, comprising a support for supporting an article neck down, an annular burner beneath the support, a second burner above the support, means to move the support and burners in an endless path, and means to move the burners to and from an article in the support during their motion in the endless path.

10. Apparatus for severing glass bulbs, comprising a bearing for a vertical shaft, a fork on the lower end of the shaft adapted to support a bulb with its axis in line with that of the shaft, means to move the bearing in an endless path, a rack adjacent a portion of the path, a member adjacent another portion of the path, a pinion on the shaft adapted to mesh with the rack, a collar on the shaft having a flattened surface adapted to engage said member, and means to melt off a supported bulb while the pinion of the support is in mesh with the rack.

11. Apparatus for finishing glass articles, comprising a bearing for a vertical shaft, a support on the lower end of the shaft adapted to support an article with its axis in line with that of the shaft, an annular burner with its axis in line with that of the shaft, means to move the shaft and burner laterally, and a cam track governing the position of the burner in the direction of said axis.

12. Apparatus for finishing glass articles, comprising a bearing for a hollow vertical shaft, a support on the lower end of the shaft adapted to support an article with its axis in line with that of the shaft, a hollow rod within the shaft, a burner on the lower end of the rod, and means for reciprocating the rod within the shaft.

13. Apparatus for finishing glass articles, comprising a bearing for a hollow vertical shaft, a support on the lower end of the shaft adapted to support an article with its axis in line with that of the shaft, a hollow rod within the shaft, a burner on the lower end of the rod, means for reciprocating the rod within the shaft, and adjustable means limiting the downward movement of the rod.

14. Apparatus for finishing glass articles, comprising an annular series of units, each unit having a burner for treating an article, means for rotating the series about its axis, a plate rotating with the series and having a series of chambers, connected one with each burner, and a port for each chamber, a stationary chamber plate having a series of ports each adapted to register successively with the ports of the rotating plate, and a needle valve for adjusting the opening of each port of the stationary plate.

In testimony whereof we have hereunto signed our names to this specification.

ALVAH C. PARKER.
CARL W. SCHREIBER.